United States Patent Office 3,553,193
Patented Jan. 5, 1971

3,553,193
METHOD OF OXIDIZING STARCH
David H. Le Roy, North Riverside, and Stanley M. Parmerter, Wheaton, Ill., assignors to CPC International Inc., a corporation of Delaware
No Drawing. Filed Apr. 10, 1968, Ser. No. 720,395
Int. Cl. C08b 19/01
U.S. Cl. 260—233.3                                20 Claims

ABSTRACT OF THE DISCLOSURE

Covers a method of preparing carbonyl-containing starches. Particularly covers a method of preparing carbonyl starches by reaction of starch with either an alkali metal hypobromite or an alkali metal bromite under carefully controlled conditions to provide an oxidized starch product having a substantially greater proportion of carbonyl groups than carboxyl groups. Also covers a method of selectively oxidizing side chains of starch derivatives under the same process conditions whereby the underivatized starch hydroxy radicals contained in the anhydroglucose units are substantially non-oxidized.

---

In most known prior art methods of starch oxidation, substantial carboxy function is formed along with introduction of carbonyl function into the molecule. Yet, in some instances, it is preferred that the primary function introduced into the molecule be carbonyl and that such product contain little carboxyl presence. This is desirable, for example, since the carbonyl groups are more highly reactive with certain reagents such as amines and useful derivatives can be thereby attained. Also, in many applications a relatively high carbonyl content in starch derivatives is greatly desired, since this may lead to enhanced activity in the particular application to which they are additively employed.

In like manner, when one oxidizes derivatized starches containing oxidizable radicals on the side chain by usual prior art techniques, both the radicals on the side chains are oxidized as well as the hydroxy groups of the anhydroglucose units of the starch itself. Again, substantial carboxyl content is produced in both sites. To date there exists no simple and economical method of selectively oxidizing starch side chains whereby a relatively high carbonyl content is achieved and as well the hydroxy groups of the anhydroglucose units of the starch are substantially non-oxidized during the process.

It would therefore be a substantial advance in the art if a method were available of oxidizing starches whereby a high carbonyl content could be realized both in the absolute sense as well as relative to production of carboxyl function. It would be a further advance if by the same method derivatized starches could be oxidized whereupon the oxidizable radicals contained on the side chains were selectively oxidized, and the underivatized hydroxy units of the starch were unoxidized to any substantial degree. Products of this type would be novel, and have application in many areas. For example, the high carbonyl-content starch products could be used to replace dialdehyde starch in the same end-uses to which this material is now employed. Such above method would be particularly valuable, if it could be carried out at a relatively low cost, and without formation of undesirable by-products. By way of further utility, high carbonyl starches produced via this method, whether the starting starch material was starch itself or a starch derivative, could be further chemically transformed by known methods, such as to amino starches of known usefulness. Due to high carbonyl content of the starting starch products further reacted with an amine, a substantial amount of amine character could be imparted to the amino starches so prepared through the intermediate carbonyl.

In view of the above, it therefore becomes an object of the invention to provide a method of introducing a relatively high carbonyl content into starches via a specific oxidizing technique.

Another object of the invention is to produce a highly oxidized starch product having a greater proportion of carbonyl groups than carboxyl groups.

A still further object of the invention is to provide a method of selectively oxidizing oxidizable radicals contained on starch side chains, whereby under conditions of the reaction the starch hydroxy groups contained in the anhydroglucose units are left substantially unoxidized.

Yet another object of the invention is to provide starch products prepared via the above described method.

Another object of the invention is to provide high carbonyl content starches which may be useful additives in a variety of applications per se or as further derivatized products. For example, such products would have exceptional utility in enhancing paper wet and dry strength characteristics.

Other objects will appear hereinafter.

BROAD DESCRIPTION OF THE INVENTION

In accordance with the invention we have discovered a method of preparing relatively high carbonyl content starches. Broadly speaking, the method of the invention comprises the steps of treating an aqueous slurry of starch at a pH of 5–8.5 and at a temperature of less than 25° C. with an oxidizing reagent which may either be an alkali metal hypobromite or an alkali metal bromite. There is thus provided an oxidized starch product having a substantially greater proportion of carbonyl groups than carboxyl groups, as well as a high carbonyl content in the absolute sense.

In another embodiment of the invention a starch derivative containing oxidizable radicals on the starch side chains is oxidized via the same technique. Products of this type are again high in carbonyl content, and selectively have the oxidizable radicals so oxidized in preference to the hydroxy groups of the anhydroglucose units of starch. In most instances few of the latter hydroxy groups of starch are oxidized, and are left substantially untouched during the reaction.

It is not completely understood why both the above phenomena occur, that is, selective formation of carbonyl function, and selective oxidation of side chains in preference to the hydroxyl groups of starch itself. It has been found, however, that the steps of the invention must be carefully followed to produce both of these effects, and if substantial deviation takes place from the suggested method directions, both a greater proportion of carboxyl content is introduced relative to carbonyl content, and selective oxidation of the side chains does not take place.

The starches used in practicing the invention may be derived from any vegetable source, such as, for example, corn, wheat, potato, tapioca, rice, sago and grain sorghum. The waxy starches may also be used. The term "starch" is used broadly herein and encompasses unmodified starch and tailings, and, as well starch that has been modified by treatment with acids, alkalies, enzymes, etc. Soluble or partially soluble modified starches, dextrins, pregelatinized products, and starch derivatives of varying types are also suitable in the process.

In addition, high amylose starch, such as, for example, high amylose corn starch, may also be used. A high amylose starch may be prepared in several different ways. For example, it may be recovered from a hybrid corn that is rich in amylose, or it may be prepared by separating an amylose fraction from ordinary starch and blending the fraction with other starchy materials.

Preferred here are potato, corn and waxy milo starches. The starch material undergoing treatment may either be in granular form or one that has been already pasted or pregelatinized prior to oxidation. The choice of whether the starting starch material is granular or gelatinized will depend upon the ultimate end-use to which it is placed after oxidation.

If a granular oxidized starch product is desired, one, of course, starts with a granular starch material. The granular structure will be maintained during the process, particularly if one does not use large proportions of oxidizing agents. However, the granular structure will tend to be destroyed if excess molar quantities of oxidizing material are used.

Again, the starch polymeric structure may be substantially maintained depending upon the reaction conditions under which one operates. For example, if the oxidation is carried out at a relatively low temperature, say about 0° C., no depolymerization takes place. That is, there occurs no substantial cleavage of linkage between the anhydroglucose units or degradation of the units themselves. On the other hand, if one carries out the oxidation at about room temperature, say about 20° C., some depolymerization does take place. Thus, again, one can achieve products whereby the essential structure of starch itself is maintained or again one can realize products which have some molecular degradation. Again, products of both types are useful, depending upon the application in which they are additively employed.

In the second embodiment of the invention starch derivatives are oxidized which contain oxidizable radicals on their side chains. The starch derivatives that can be oxidized here may be chosen from a wide variety of starches which contain an oxidizable group on the starch side chain. In most instances this oxidizable radical will be a hydroxy group. Thus, if the hydroxy group is on the terminal carbon of the side chain, an aldehyde radical will be produced. If, on the other hand, the hydroxy group is somewhere on the chain itself, and not on the terminal carbon atom, keto groups will be produced. It is understood, of course, that the side chain may contain more than one oxidizable radical of varying types. Thus, for example, if two or more hydroxy radicals are contained on the side chain they may all be oxidized to a substantial degree. Typical starch derivatives which may be oxidized are hydroxy alkyl starch ethers, such as dihydroxypropyl starch ether or hydroxy ethyl starch ether. Other starch derivatives which may be oxidized are starch polyethers, such as those made by alkoxylating starch with such reagents as ethylene oxide, propylene oxide, butylene oxide, etc. It is obvious that any starch derivative containing an oxidizable radical on the side chain may be selectively oxidized according to the procedures broadly set out above, and described in more detail below.

DETAILED DESCRIPTION OF THE INVENTION

The first step of the invention is forming an aqueous suspension of starch. The solids content of the suspended starch, whether the starch be pregelatinized or granular, may be widely varied. Usually the aqueous suspension will contain 5–40% solids content of starch (dry basis) and more often 5–20%, said percentages being based on total weight of starch and water.

To the starch is then added an alkali metal hypobromite or alkali metal bromite or various mixtures of the two. Preferred here are sodium hypobromite and sodium bromite.

In order to achieve high carbonyl content, and particularly a high ratio of carbonyl to carboxyl in the final product, it is essential that the aqueous suspension of starch undergoing reaction be held at a temperature less than about 25° C., more preferably within a temperature range of 0–20° C., and most preferably within a temperature range of 0–10° C. If the reaction is run at a temperature substantially above 25° C., substantial amounts of carboxyl function is achieved at sacrifice of achievement of carbonyl content.

Again, it is important that the pH of the starch suspension undergoing treatment be maintained within a range of 5–8.5. The highest ratio of carbonyl content to carboxyl content in terms of their respective degrees of substitution occurs at a pH range of about 7–8. If the reaction is run substantially above about pH 8.0 products of high carboxyl content are produced relative to carbonyl content. On the other hand, if the pH is somewhat below about 5.0 substantially no carbonyl function is achieved whatsoever. Thus, it is important that the discussed process variables be carefully followed in order to achieve the desired products.

The amount of oxidizing agent which can be added to the aqueous suspension of starch will widely vary, particularly according to the degree of substitution sought in the final product. Thus, for example, the ratio of oxidizing agent to starting starch material may range from about 0.2 to about 2.5 moles of reagent per mole of starch.

As noted above, either alkali metal hypobromite, alkali metal bromite or mixtures thereof, may be used. One preferred oxidizing agent is an aqueous solution of an alkali metal hypobromite such as sodium hypobromite wherein the solution contains 3–15% by weight of sodium hypobromite. If an aqueous solution of this type is utilized the pH of said solution is usually greater than about 11.0. This tends to stabilize the hypobromite and prevent its decomposition prior to use.

The time of reaction may widely vary, depending upon the degree of substitution sought, particular starch being oxidized, temperature of oxidation, concenration of starch in the reaction mixture, amount of oxidizing agent being added etc. Usually, the reaction is considered complete in 1–24 hours. Further extension of contact time of starch and oxidizing agent is not detrimental, and may be even extended 72 hours or longer without departing from the scope of the invention.

The starch product may be recovered by conventional means such as by filtration followed by solvent treatment in some cases, grinding of the product into a powder, and repeated solid washing, etc. In other cases, the product may be freeze-dried to dryness. Alternately, the product may be precipitated by a direct addition of solvent to the reaction mass, and then subjected to solvent grinding and washing. Preferred purification solvents are methanol, ethanol, isopropyl alcohol and other lower alkyl alcohols.

If the reaction is properly carried out the oxidized starch product has a greater proportion of carbonyl groups produced compared to carboxyl groups. That is, the ratio of carbonyl groups to carboxyl groups is greater than 1. In some instances this ratio may range from about 2–8 to about 1, though the usual case is about 3–6:1. As noted above, these higher ratios are particularly achieved when the reaction is run at a pH of 7–8.

The above described method is equally applicable to oxidizing starch derivatives which contain an oxidizable radical in one or more side chains off the basic starch unit. In this regard, it was surprising to discover that the oxidizable radicals on the side chains were preferentially oxidized, and that the hydroxy groups contained on the basic anhydroglucose units of starch were not oxidized to any substantial degree. In fact, in some experiments, by sophisticated analytical determinations it was found that only the side chains were oxidized, and no oxidation occurred whatsoever on the basic starch unit. This was a completely unexpected discovery, leading to products which may be carefully tailored to meet needs in various applications. As an example, these products can be further synthesized to specific starch derivatives of the type sought after, such as oxime or amine derivatives, which groups will be only present or present to a great degree on the starch side chains. Again, just as in the situation of reaction of underivatized starches the starch which undergoes reaction here may either be in granular or gelatinized form. The granular structure may be maintained if relatively low reaction temperatures are employed, say 0–10° C., and the molar ratio of oxidizing agent to starch derivative is not too high.

It is believed that the oxidized starches produced via the process of the invention are also novel. Thus, when an underivatized starch is oxidized, a product is produced which contains both carbonyl and carboxyl groups wherein the ratio of carbonyl groups to carboxyl groups ranges from about 2–8 to about 1, and the carbonyl D.S. falls within the range of 0.01–0.5. Preferred products of this type are derived from corn starch, waxy milo starch, or potato starch. Greatly preferred products have a ratio of cabonyl groups to carboxyl groups of 3–6:1.

Likewise, it is thought that the oxidized starch derivatives made by oxidizing a starch derivative having oxidizable radical contained on the starch side chains are likewise new. Again, products of this type have a greater proportion of carbonyl groups than carboxyl groups formed on the side chains, and the underivatized hydroxy groups of the starch are substantially non-oxidized. Preferred products have the same ratio of carbonyl groups to carboxyl groups as set out above. Again, these starches have a carbonyl D.S. falling within the range set out above, though in this instance the carbonyl groups, of course, are contained in the side groupings off the basic starch unit.

The products of the invention are useful as tanning agents for leather, as cross-linking agents for textiles and other like materials, as intermediates useful in producing other derivatives such as amine derivatives, as warp sizing agents for textiles, as adhesives, as surface coatings, as textile additives to improve crease-proof and crush-proof properties, etc.

The materials are particularly useful in treating paper to improve wet strength and other properties. Paper may be treated with compositions of the invention generally in one of several ways, such as by tub-sizing, by size press, or by the use of a beater additive. In both the tub-sizing or the size press processes the carbonyl starches of the invention are acidified, and paper immersed in the acidified dispersion. This may be accomplished by the use of rolls which are immersed in the dispersion over which the paper passes, or by simply dipping paper into the dispersion. The coated paper is then cured by heating to a temperature in the range of from about 80° C. to about 110° C.

The compositions as described herein may also be used to treat paper by adding them directly to the paper pulp. Paper pulp and carbonyl starch compositions are first mixed at the wet end of the paper manufacturing process. For example, addition may be made as desired to the beater itself or alternately to the chest, Jordan discharge line, screen or headbox. Usually, prior to addition of materials of this type the pH of the pulp is adjusted downward. The thus treated paper is then immediately dried as above described.

In yet another application the carbonyl starches may be further reacted with amines to produce compositions useful as binders, such as binders for non-woven fabrics. Again the carbonyl groups may be reacted with proteins or resins such as urea-formaldehyde resins and used in applications where the latter are employed.

It was also interesting to note that in experiments involving alkali metal hypochlorites such as sodium hypochlorite the effects as noted above do not occur. That is, one does not obtain a starch product having a higher proportion of carbonyl than carboxyl content. Likewise, one does not realize the selective oxidation of the starch side chains. Again, this was somewhat unexpected in view of the chemical similarity of halo reagents of this type which in many situations react in an almost analogous manner when employed for one use or the other, such as in oxidation reactions in other fields of chemistry The process of the invention and products derived therefrom will be better understood by reference to the following examples. Also, there is shown in a number of experiments the importance of operating within the limits of the invention as set out above. These examples are included for purposes of illustration, and are not to be construed as in any way limiting the scope of this invention which is defined in the claims appended hereto.

EXAMPLE I

Importance of pH control

In this series of runs 1.0 mole of starch (162 grams dry basis) was slurried in 200 ml. of water and adjusted to the desired pH. While holding at a constant temperature, sodium bromite or hypobromite solutions (in a volume equivalent to 0.1 mole oxidant) were slowly added to the starch. The pH was maintained within the desired range by proper addition of acid or base. The reactions were continued for a total of 2 hours. The starches were filtered, washed with water, reslurried in water, adjusted to a pH of 5.5, refiltered, washed and dried.

In some runs the reactions were effected within the pH range suggested here. In other runs the pH was higher than the maximum pH range disclosed in the invention. In these non-inventive runs it is noted from Table I below that the carboxyl content is actually higher than the carbonyl content in terms of D.S. (degree of substitution of the respective radicals). Details of these experiments are set out below.

TABLE I

| pH | Oxidant, 0.1 mole/mole starch | Temperature, 0°C. Carboxyl, D.S. | Temperature, 0°C. Carbonyl, D.S. | Temperature, 20°C. Carboxyl, D.S. | Temperature, 20°C. Carbonyl, D.S. |
|---|---|---|---|---|---|
| 12.0 | Sodium hypobromite | 0.059 | 0.037 | | |
| 10.0 | do | 0.046 | 0.045 | 0.056 | 0.035 |
| 8.0 | Sodium bromite | 0.026 | 0.079 | 0.038 | 0.072 |
| 8.0 | Sodium hypobromite | 0.017 | 0.094 | 0.027 | 0.068 |
| 7.0 | do | 0.009 | 0.066 | 0.021 | 0.078 |

Scott viscosities of the above products were also measured and bore out the fact that only a slight depolymerization occurred, particularly when oxidations were run at 0° C. When oxidations are run at room temperatures, some thinning of the starch does occur. It should also be noted that the sodium hypobromite oxidized product when oxidized within the preferred pH range, namely pH 8, had a carbonyl:carboxyl ratio of about 5:1.

EXAMPLE II

Effect of bromite:starch ratio

In this series of runs the ratio of the oxidant was varied in proportion to amount of starch reactant. The particular oxidant was sodium bromite, and the reaction was run for two hours within the range of 0° C. to 25° C. Results tabulated below in Table II indicate the mole ratio of oxidant to starch can be widely varied without departing from the scope of the defined products.

TABLE II

| Oxidant, mole sodium bromite/mole starch | Carboxyl, D.S. | Carbonyl, D.S. | Recovery, percent |
|---|---|---|---|
| 0.1 | 0.039 | 0.076 | 97 |
| 0.5 | 0.13 | 0.20 | 100 |
| 1.0 | 0.20 | 0.28 | 96 |
| 2.0 | 0.32 | 0.39 | 90 |

The last product described in the above table was particularly interesting in that it was most unexpected to find good product recovery while using such a high sodium bromite concentration. Moreover, the extremely high D.S. product could be washed with water, while a comparable 0.3 D.S. carboxyl starch containing no carbonyl groups could not be so washed.

EXAMPLE III

Variation of oxidant:starch ratio and temperature of reaction

Here samples of thick-boiling corn starch were treated at differing oxidant levels. In all cases the oxidant was sodium hypobromite, the reaction pH was 8.0 and the reaction temperatures were either 0° C. or 20° C. Products were prepared that ranged in fluidity from thick-boiling, that is those wherein essentially no depolymerization occurred, to 80+fluidity products. Thus, by carefully controlling conditions one can realize products which have a high carbonyl content and also any desired fluidity. It was noted that increasing the amount of oxidant increased both carbonyl and carboxyl content and as well caused thinning. However, in all cases the carbonyl content was substantially higher than the carboxyl content regardless of the level of the degree of substitution. Results are tabulated below.

TABLE III

| Molar ratio, oxidant:starch | Temperature, °C. | Oxidant, percent | | Carboxyl, D.S. | Carbonyl, D.S. | Recovery, percent | Product fluidity |
|---|---|---|---|---|---|---|---|
| | | NaOBr | NaBrO₂ | | | | |
| 0.025 | 0 | 10.5 | 3.98 | 0.010 | 0.025 | 100 | (¹) |
| 0.050 | 0 | 10.5 | 3.98 | 0.017 | 0.050 | 100 | (¹) |
| 0.10 | 0 | 4.44 | 0 | 0.017 | 0.094 | 97 | (¹) |
| 0.10 | 20 | 4.44 | 0 | 0.018 | 0.077 | 81 | 13 |
| 0.15 | 0 | 10.5 | 3.98 | 0.043 | 0.124 | 99 | 35 |
| 0.15 | 20 | 12.4 | 2.33 | 0.046 | 0.155 | 94 | 20 |
| 0.25 | 0 | 12.6 | 3.22 | 0.041 | 0.124 | 95 | 23 |
| 0.25 | 20 | 12.2 | 3.27 | 0.042 | 0.130 | 79 | 52 |
| 0.50 | 0 | 10.5 | 1.85 | 0.19 | 0.32 | | 80+ |

¹ Thick.

EXAMPLE IV

Effect of pH within invention range

Even within the broader operable pH range suggested here, it was found that the highest molar ratio of carbonyl to carboxyl in the starch products could be found within a rather limited pH range of about 7.0–8.0. In this series of runs 0.5 mole of oxidant comprising a mixture of sodium hypobromite and sodium bromite were reacted per mole of starch at 0° C. at various pH ranges. Results are shown in Table IV below. The highest molar ratio of carbonyl to carboxyl groups in the products occurred at about 7.0–7.5 pH.

TABLE IV

| pH | Oxidant, percent | | Carboxyl, D.S. | Carbonyl, D.S. | Molar ratio, carbonyl:carboxyl | Recovery, percent |
|---|---|---|---|---|---|---|
| | NaOBr | NaBrO₂ | | | | |
| 6.0 | 12.78 | 2.15 | 0.060 | 0.070 | 1.17 | 83 |
| 7.2 | 12.70 | 2.31 | 0.020 | 0.13 | 6.50 | 90 |
| 7.6 | 12.60 | 3.22 | 0.033 | 0.13 | 3.94 | 95 |
| 7.8 | 13.10 | 1.05 | 0.090 | 0.26 | 2.89 | 84 |
| 8.0 | 10.50 | 1.85 | 0.19 | 0.32 | 1.68 | |

EXAMPLE V

Variation in starch source

Here a number of starches were treated with sodium hypobromite namely corn, waxy milo and potato starches. In each instance high carbonyl products were produced and good product recoveries were realized. The starches were treated at pH 8.0 with 0.1 mole of oxidant per mole of starch. Results are as follows:

TABLE V

| Name | Carboxyl, D.S. | Carbonyl, D.S. | Recovery, percent |
|---|---|---|---|
| Corn | 0.017 | 0.074 | 97 |
| Waxy milo | 0.035 | 0.090 | 96 |
| Potato | 0.033 | 0.076 | 98 |

EXAMPLE VI

Selective oxidation of starch derivative

Here a specific starch derivative was oxidized according to the process of the invention, namely, dihydroxypropyl starch ether. 0.1 mole of a 4.5% aqueous solution of sodium hypobromite was the oxidant. The reaction was run at pH 8.0 and at 0° C. The derivative had a degree of substitution before oxidation of 0.115, and a degree of substitution after oxidation of 0.058. The oxidized product had a carboxyl D.S. of 0.021 and a carbonyl D.S. of 0.065. The loss of substituent degree of substitution almost equaled the appearance of carbonyl degree of substitution. This indicated that all the carbonyl function was produced on the side chain, and that the hydroxyl groups of the basic units of the starch were not oxidized to any substantial degree.

In a similar run a starch polyether (propoxylated starch, M.S. of 7.8) was oxidized with 1.7 moles of oxidant per mole of starch by resort to use of a mixture of 10.9% sodium hypobromite and 3.08% sodium bromite in water. The reaction was again run at a pH of 8.0 and at 0° C. The final oxidized product had a carbonyl D.S. of 1.38.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method of oxidizing starch to provide a carbonyl-containing starch product which comprises the steps of treating an aqueous slurry of starch at a pH of 5–8.5 and at a temperature of less than 25° C. with an oxidizing reagent selected from the group consisting of an alkali metal hypobromite, an alkali metal bromite, and mixtures thereof to provide an oxidized starch product having a greater proportion of carbonyl groups than carboxyl groups.

2. The method of claim 1 wherein the ratio of said oxidizing reagent to said starting starch material ranges from about 0.02 to about 2.5 moles of reagent per mole of starch.

3. The method of claim 1 wherein said oxidizing reagent comprises a mixture of said alkali metal hypobromite and said alkali metal bromite.

4. The method of claim 1 wherein said oxidizing reagent is an alkali metal hypobromite.

5. The method of claim 4 wherein said alkali metal hypobromite is added in aqueous solution form to said starch slurry, said aqueous solution having a pH greater than 11.0.

6. The method of claim 4 wherein said pH is 7–8 and said temperature is 0–20° C.

7. The method of claim 6 wherein the ratio of said alkali metal hypobromic oxidizing agent to starch ranges from about 0.02 to about 2.5 moles of oxidizing agent per mole of starch.

8. The method of claim 6 wherein said alkali metal hypobromite is sodium hypobromite.

9. A method of selectively oxidizing side chains of starch derivatives to provide a carbonyl-containing starch product which comprises treating an aqueous slurry of said starch derivative at a pH of 5–8.5 and at a temperature of less than 25° C. with an oxidizing reagent selected from the group consisting of an alkali metal hypobromite, an alkali metal bromite and mixtures thereof to provide an oxidized starch product having a greater proportion of carbonyl groups than carboxyl groups formed on said side chains, and wherein under the conditions of said reaction said oxidation occurs primarily on said side chains with the underivatized hydroxyl groups of said starch derivative being substantialy non-oxidized.

10. The method of claim 9 wherein said starch derivative undergoing oxidation is a dihydroxypropyl starch ether.

11. The method of claim 9 wherein said oxidizable radical is a hydroxy radical.

12. The method of claim 9 wherein said starch derivative undergoing oxidation is in granular form and substantially maintains said granular form after said reaction.

13. The method of claim 9 wherein said starch derivative undergoing reaction is a alkoxylated starch whereby there is provided a starch polycarbonyl ether product.

14. The method of claim 9 wherein said oxidizing reagent is an alkali metal hypobromite.

15. The method of claim 14 wherein said alkali metal hypobromite is added in aqueous solution form to said starch derivative undergoing oxidation, said aqueous solution having a pH greater than 11.

16. The method of claim 9 wherein the ratio of said oxidizing reagent to said starch derivative undergoing oxidation ranges from about 0.02 to about 2.5 moles per mole of starch.

17. The method of claim 9 wherein the carbonyl D.S. of said product ranges from about 0.01 to about 0.5.

18. The method of claim 9 wherein said alkali metal hypobromite is sodium hypobromite and said alkali metal bromite is sodium bromite.

19. A carbonyl- and carboxyl-containing starch prepared by oxidizing an alkoxylated starch with an alkali-metal hypobromite, an alkali metal bromite or mixtures thereof at a pH of 5–8.5 and at a temperature of less than 25° C. whereby the resulting oxidized starch has a greater proportion of carbonyl groups than carboxyl groups and the underivatized hydroxy groups of said alkoxylated starch are substantially non-oxidized.

20. The carbonyl- and the carboxyl-containing starch of claim 19 wherein the ratio of carbonyl groups to carboxyl groups is within the range of from about 2:1 to about 8:1.

References Cited

UNITED STATES PATENTS

| | | | |
|---|---|---|---|
| 2,648,629 | 8/1953 | Dvonch et al. | 204—79 |
| 2,951,776 | 9/1960 | Scallet et al. | 127—71 |
| 3,033,851 | 5/1962 | Schaefer et al. | 260—233.3 |
| 3,083,072 | 3/1963 | Leclerc | 8—138 |
| 3,086,969 | 4/1963 | Slager | 260—209 |
| 3,203,885 | 8/1965 | Meiners et al. | 204—158 |
| 3,313,641 | 4/1967 | Bochert | 106—213 |
| 3,329,672 | 7/1967 | Roberts | 260—233.3 |
| 3,377,339 | 4/1968 | Sisido et al. | 260—233.3 |

DONALD E. CZAJA, Primary Examiner

M. I. MARQUIS, Assistant Examiner

U.S. Cl. X.R.

117—139.5, 156; 162—175; 260—6, 9, 209, 233.5